Dec. 6, 1960
C. H. WATSON
2,963,221
EXTENSOMETER
Filed Feb. 25, 1958
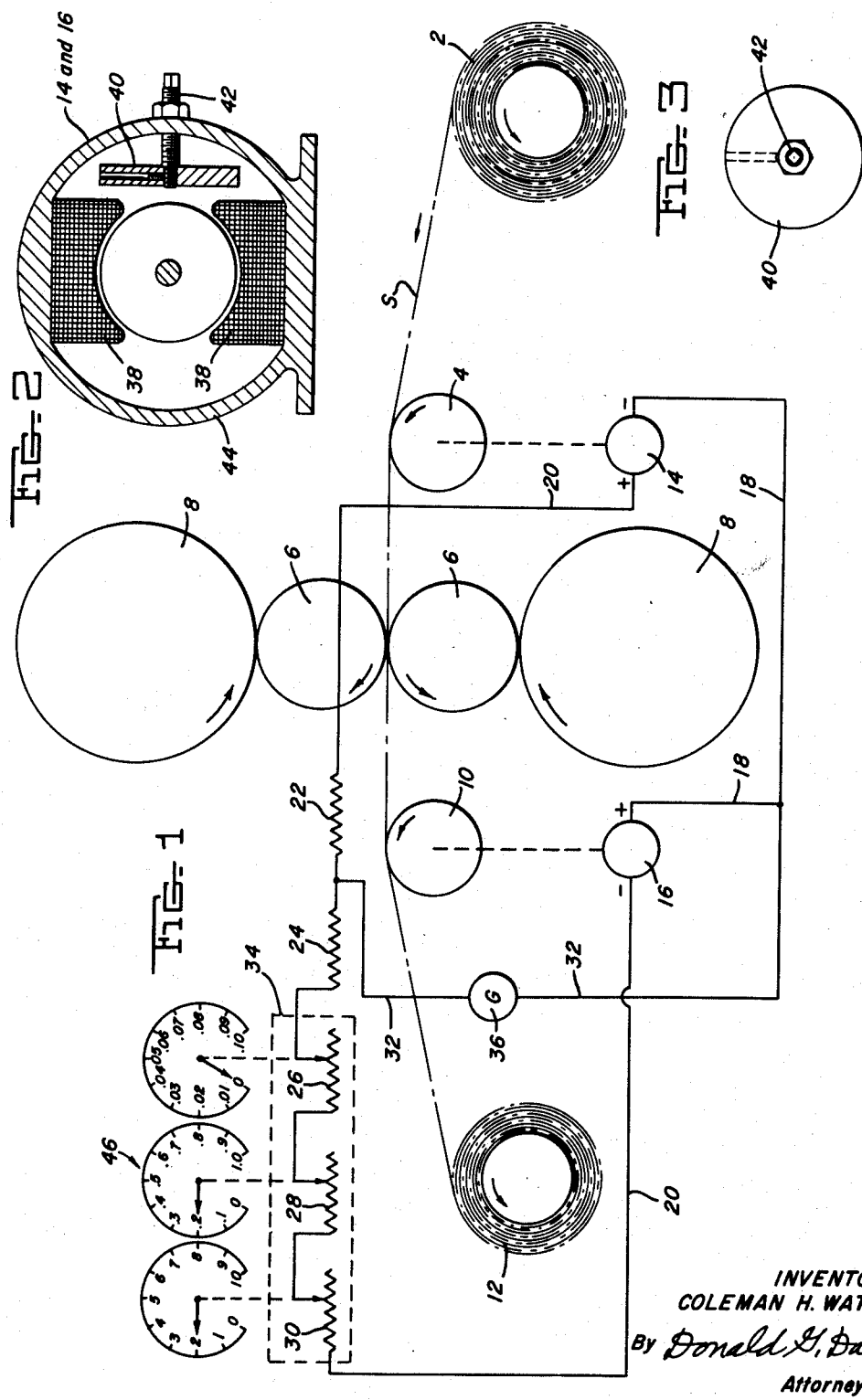
INVENTOR
COLEMAN H. WATSON
By Donald G. Dalton
Attorney

United States Patent Office 2,963,221
Patented Dec. 6, 1960

2,963,221

EXTENSOMETER

Coleman H. Watson, Birmingham, Ala., assignor to United States Steel Corporation, a corporation of New Jersey Filed Feb. 25, 1958, Ser. No. 717,363

4 Claims. (Cl. 235—103.5)

This invention relates to an extensometer and more particularly for an extensometer used to measure the percent extension of a strip in temper rolling. Apparatus for this purpose is shown in the patent to Reed, No. 2,525,182, dated October 10, 1950. However, this device has not proved practical because it requires the use of identical generators which are not available at present, at least in commercial products. The reason for this is that the difference of speed in the two generators utilized is very slight and the voltage output for the same speed may vary as much as the voltage output difference between the two generators when operating at different speeds.

It is therefore an object of my invention to provide an extensometer with a definite zero range so that the smallest deviation from zero can be readily determined by the operator and speedily corrected.

Another object is to provide an inexpensive extensometer that can withstand the rough usage usually encountered in mill service with a minimum of maintenance.

Still another object is to provide an extensometer that will not require change of calibration with a change of speed on the mill.

A further object is to provide an extensometer that can be calibrated to read percent error in the amount it is off zero so that the operator can readily make the necessary corrections to get the system back in balance.

A still further object is to provide an extensometer that can compensate for difference in diameter of idler rolls without causing error in measurements.

These and other objects will be more apparent after referring to the following specification and attached drawings, in which:

Figure 1 is a schematic view of the extensometer of my invention as applied to a temper rolling mill;

Figure 2 is a sectional view of the tachometer generator used in my invention; and Figure 3 is a view of the shunt of the generator of Figure 2.

Referring more particularly to the drawings, the reference numeral 2 indicates an uncoiler from which the strip S is uncoiled. The uncoiled strip passes over idler roll 4 into the work rolls 6 of a temper rolling mill which is provided with back up rolls 8. After passing through the work rolls 6 the strip S passes over idler roll 10 and is coiled on coiler 12. The peripheral speeds of rolls 4 and 10 are substantially the same as the speed of the strip over these rolls so that the peripheral speed of the roll 10 will be greater than that of roll 4 by an amount directly proportional to the extension. D.C. generators 14 and 16 are connected to be driven by rolls 4 and 10, respectively. The characteristics of generators 14 and 16 are the same and their voltage output increases directly in proportion to their speed. A lead 18 connects the negative terminal of generator 14 to the positive terminal of generator 16. The positive terminal of generator 14 is connected to the negative terminal of generator 16 by means of a connection 20 including resistors 22, 24, 26, 28 and 30. A connection 32 is provided between the lead 18 and the connection 20 at a point between resistors 22 and 24. The resistor 22 may be adjustable for the purpose of calibration but once set will not be changed during the operation of the mill and extensometer. The resistors 26, 28 and 30 are contained in a decade box 34. A galvanometer 36 is arranged in connection 32. This galvanometer may be either indicating or recording. Generators 14 and 16 have permanent magnet fields 38 and an adjustable field magnet shunt 40 so constructed that the permanent magnet field strength may be adjusted by the shunt to regulate the voltage generated. The shunt is a soft steel disc mounted on a threaded stud 42 which is threaded into a cast iron frame 44.

The operation of my extensometer is as follows:

The resistor 22 is selected so that the value of its resistance plus the internal resistance of generator 14 will represent 100%, for example, 100 ohms. The resistors 26, 28 and 30 are adjustable along scales 46 to read elongation in terms of percent increase in speed of generator 16 over generator 14. For example, if 2% elongation is desired in rolling the total resistance of generator 16 and resistors 24, 26, 28 and 30 would be adjusted to 1020 ohms. If 4% elongation is desired the adjustment would be to 1040 ohms. The desired elongation may be accomplished by the roll operator keeping the bridge balanced with the galvanometer 36 on zero at all times during the process of rolling. The percent increase in length of strip is then indicated by the resistance setting on the calibrated decade box 34. In the drawing the elongation is shown as 2.20 percent on scales 46. When it becomes necessary to adjust or calibrate the extensometer for change in diameter of the idler rolls the mill is run with enough tension on the strip to drive the idler rolls without slippage but without elongating the strip. The voltage of the generators is then adjusted by shunts 40 until a balance is obtained on galvanometer 36 with all the resistances in the decade box being set on zero elongation.

While one embodiment of my invention has been shown and described it will be apparent that other adaptations and modifications may be made without departing from the scope of the following claims.

I claim:

1. An extensometer for determining the elongation of an object passing through a reducing machine which comprises a D.C. generator driven at a speed proportional to entering object speed, a second D.C. generator driven at a speed proportional to exit object speed, said generators having similar speed-voltage characteristics, a lead connecting the positive terminal of one of said generators to the negative terminal of the other of said generators, a connection between the other terminals of said generators including two resistors connected in series, means for adjusting the value of one of said resistors, a connection between said lead and said first named connection between said resistors, and a galvanometer in said last named connection.

2. An extensometer according to claim 1 in which said generators have an adjustable field magnet shunt.

3. An extensometer for determining the elongation of an object passing through a reducing machine which comprises a D.C. generator driven at a speed proportional to entering object speed, a second D.C. generator driven at a speed proportional to exit object speed, said generators having similar speed-voltage characteristics, a lead connecting the positive terminal of one of said generators to the negative terminal of the other of said generators, a connection between the other terminals of said generators including two resistors connected in series, means for adjusting the value of the resistor adjacent said second generator, the resistance in the circuit including said first named generator and the resistor adjacent thereto being substantially equal to the resistance in the circuit including said second named generator and the resistor adjacent thereto when no reduction in size of said object is taking place, a connection between said lead and said first named connection between said resistors, and a galvanometer in said last named connection.

4. An extensometer according to claim 3 in which said generators have an adjustable field magnet shunt.

References Cited in the file of this patent

UNITED STATES PATENTS

| | | |
|---|---|---|
| 2,248,504 | Kenny | July 8, 1941 |
| 2,447,209 | Rendel et al. | Aug. 17, 1948 |
| 2,525,182 | Reed | Oct. 10, 1950 |